US005739429A

United States Patent [19]

Schmitkons et al.

[11] Patent Number: 5,739,429

[45] Date of Patent: Apr. 14, 1998

[54] POWDER COATING SYSTEM INCORPORATING IMPROVED METHOD AND APPARATUS FOR MONITORING FLOW RATE OF ENTRAINED PARTICULATE FLOW

[75] Inventors: James W. Schmitkons, Lorain; Richard P. Price, Parma Heights; John R. Askew, North Olmsted; Jan L. Shanaberger, Westlake, all of Ohio

[73] Assignee: Nordson Corporation, Westlake, Ohio

[21] Appl. No.: 639,402

[22] Filed: Apr. 29, 1996

Related U.S. Application Data

[63] Continuation-in-part of Ser. No. 501,891, Jul. 13, 1995, abandoned.

[51] Int. Cl.$^6$ .................... G01F 1/74

[52] U.S. Cl. .................... 73/196; 73/861.64

[58] Field of Search .................... 73/195, 196, 861.04, 73/861.63, 861.64; 251/24

[56] References Cited

U.S. PATENT DOCUMENTS

| | | | |
|---|---|---|---|
| 4,185,783 | 1/1980 | Lacchia | 239/704 |
| 4,198,860 | 4/1980 | King | 73/86.63 |
| 4,231,262 | 11/1980 | Boll et al. | |
| 4,480,947 | 11/1984 | Nagasaka | |
| 4,669,230 | 6/1987 | Suzuki et al. | 73/32 R |
| 4,743,143 | 5/1988 | Nagasaka | |
| 4,747,731 | 5/1988 | Nagasaka et al. | |
| 4,824,295 | 4/1989 | Sharpless | 406/109 |
| 5,018,909 | 5/1991 | Crum et al. | 406/138 |
| 5,351,520 | 10/1994 | Buquet | |

OTHER PUBLICATIONS

Bernstein et al., "Development of An Extended–Throat Venturi–Meter for On–Line Measurement of Gas–Solid Flow," Report No. 7–67R141, Dec. 1987.

Energy International, Inc., "Development of an Extended Length Venturi Meter for Gas/Solid Flows," Report No. 938R325, Mar. 1992.

*Primary Examiner*—Elizabeth L. Dougherty
*Assistant Examiner*—Max H. Noori
*Attorney, Agent, or Firm*—Rankin, Hill, Lewis & Clark

[57] ABSTRACT

A system for monitoring the flow rate of particulate material entrained within an air stream includes a feed hopper providng a source of the particulate material, and a hose for conveying the particulate material within the air stream. A pump draws the particulate material from the feed hopper and transports the particulate material with the air stream through the hose. A flow meter is associated with the hose and measures the mass flow rate of the particulate material through the hose to provide a first flow indication. A device is associated with the feed hopper and measures the change in weight of the feed hopper over a predetermined interval to provide a second flow indication. A controller corrects the first flow indication from the flow meter according to the second flow indication from the gravimetric device. The flow measurement system provides an accurate and fast responding flow meter by combining the advantages of a fast responding in-line flow meter with the accuracy of a weight measurement system.

50 Claims, 7 Drawing Sheets

POWDER COATING SYSTEM INCORPORATING IMPROVED METHOD AND APPARATUS FOR MONITORING FLOW RATE OF ENTRAINED PARTICULATE FLOW

CROSS REFERENCE TO RELATED APPLICATION

This application is a continuation in part of application Ser. No. 08/501,891, filed Jul. 13, 1995 now abandoned.

BACKGROUND OF THE INVENTION

1. Field of the Invention

This invention relates to two-phase powder flow, in other words, the flow of a fluid, such as air, in which solid particulate matter or powder is entrained, and more particularly to the monitoring and measuring of flow rates of the same.

2. Description of the Prior Art

In powder painting, dry paint particles are fluidized in a powder hopper and pumped through a hose to one or more spray guns which spray the powder onto a product to be coated. The spray guns typically charge the powder in one of two ways—either the gun has a high voltage charging electrode, or the gun has means to charge the powder by friction, i.e., tribo-electrically. When the powder particles are sprayed from the front of the gun, they are electrostatically attracted to the product to be painted which is generally electrically grounded and suspended from an overhead conveyer in a spray booth. Once these charged powder particles are deposited onto the product, they adhere there by electrostatic attraction until they are conveyed into an oven where they are melted to flow together to form a continuous coating on the product. Powder coating generally provides a tough and durable finish such as would be found on many appliances, garden furniture, lawn mowers, and other products.

It is often important to know the rate at which the powder is applied to the product by the spray guns. By knowing the powder flow rate, it can be determined how many spray guns should be included in the spray booth, what the powder pump setting should be for each gun and whether a spray gun and/or a pump is performing satisfactorily. The powder flow rate can change during the coating process due to a number of factors, such as changes in powder properties (e.g. moisture content), changes in powder flow levels, pressure conditions within the feed hopper, and clogging of the pump, the supply hose or the gun. In order to monitor these effects, it would be desirable to have flow meters inserted in the supply lines that feed the powder to the spray guns to provide an indication of the mass flow rate of powder through the supply lines.

Prior art flow meter attempts have experienced difficulties in measuring the mass flow rate of the powder, because the powder is being conveyed in a "two phase" flow, i.e., , a flow of solid powder particles entrained in a flow of conveying air. Properties such as the size of the particles, their density and their electrostatic charge can change the readings of prior art flow meters without a change in flow, resulting in significant errors in the measured flow. In powder coating systems, the physical properties of the powder can change significantly as new powder is added to the system since the ratio of the virgin powder to the reclaimed powder varies. The virgin powder may have a different particle size distribution than the reclaimed powder, and this can affect the measured flow rate. The new powder may also be of a different material having a different density which would also affect measured flow rate.

It is thus very difficult to design a powder flow meter which does not have to be constantly recalibrated for each particular type of powder and even for variations within the same type of powder. Various approaches for designing a reliable powder flow meter have been attempted, but none of these approaches has been satisfactory.

One flow meter design which has been suggested uses the properties of a Herschel-type venturi tube, which is a device that causes a drop in pressure as a fluid flows through it. Essentially, a venturi tube is a short straight pipe section, or throat, between two tapered sections. Local pressure varies in the vicinity of the constriction. Thus, by attaching a manometer, pressure transducer or other measuring device at locations around the throat, the drop in pressure can be measured and the flow rate theoretically calculated from it. Venturi flow meters are used to provide mass flow rate measurement of single phase flows, such as gas flows, through tubes or pipes. When measuring two-phase flows, however, venturi flow meters, like other flow meters which utilize pressure/flow relationships, are sensitive to many factors such as the particle size distribution of the powder, the condition of the powder, and the ratio of air to powder in the two-phase flow. This makes this type of flow meter difficult to calibrate initially and subject to the need for constant recalibration.

Research on the measurement of two-phase powder flow rate using a venturi meter has been performed with respect to supply of particulate coal in coal-fired power plants. In accordance with this research empirical calibration and an iterative method have been used to determine gas mass flow rate and powder mass flow rate. All of the methods described in this research make use of at least two differential pressure measurements across the venturi. One measurement is usually the pressure drop from the inlet to the throat, and the other measurement is the total pressure drop across the venturi. Some of this research has described the advantages of using extended throat venturis and using the inlet-to-throat and the throat-to-exit pressures changes. The differential air pressures and the absolute air pressures measured in the venturi are used to calculate powder mass flow rates using certain mathematical relationships.

Using the results of this research, it has been possible to extract powder and air flow rates from venturi flow meters in two-phase flow. However, even with these techniques, the calibration of the flow meters still varies significantly due to changes in the factors discussed above. In addition, such flow meters may be very sensitive to the properties of the flow and may give different readings depending upon how they are mounted.

A number of other powder flow measurement devices have been developed which are can measure the flow of powder entrained in a gas. These devices include pressure, capacitance, microwave and charge measurement devices. These systems are, however, generally more sensitive to the changes in the physical properties of the powder.

Problems may also be encountered with the conventional design of venturi flow meters due to powder clogging of the pressure taps. Venturi flow meters rely upon taps in the venturi flow for the pressure measurements. These taps may be prone to clogging when subjected to powder flow, since powder can accumulate in the small diameter openings formed by the taps. If the taps become partially clogged, inaccurate pressure readings can result, and it may be necessary to periodically check these taps and re-zero the control electronics associated with the transducers. This can only be accomplished by interrupting main powder flow.

SUMMARY OF THE INVENTION

The present invention provides a unique system for monitoring flow rates in a two-phase flow of powder entrained in conveying air and overcomes the difficulties and disadvantages of the prior art. The present invention recognizes the inherent difficulties in maintaining proper calibration of in-line flow meters, and therefore, provides for automatic constant recalibration of the flow meter readings to provide accurate flow measurements. The flow measurement system of the present invention provides an accurate and fast responding flow meter by combining the advantages of a fast responding pressure-type flow meter with the accuracy of a weight measurement system. The flow measurement system of the present invention provides accurate flow measurements and is insensitive to variations in powder properties, eliminating the need for constant recalibration.

The invention improves the accuracy and overcomes the drift in the readings of an in-line flow meter, such as a venturi flow meter, by combining the in-line flow meter with a gravimetric flow measurement device. The system of the present invention thus provides both instantaneous flow measurements and accurate flow measurements by combining the features of both flow measurement devices. The in-line venturi flow meter is used to measure high speed changes in flow, allowing the fast flow measurement necessary to control a dynamic process. The gravimetric or weight loss system is used to update the calibration of the venturi flow meter periodically. The venturi flow meter is able to indicate sudden changes in mass flow. The gravimetric system is much slower, but more accurate, and not affected by powder particle size distribution or other characteristics of the powder.

Preferably, the powder feed hopper is placed on a scale or load cell. The powder is then pumped from the hopper through parallel supply hoses to powder spray guns. A flow meter is placed in each of the hoses, preferably a pressure drop, or venturi, flow meter, and readings of each of the flow meters are monitored. The load cell is used to obtain weight loss information which indicates how much powder is flowing through all of the in-line flow meters. The in-line flow meters are used to provide instantaneous readings and to measure the relative amount of powder flowing through each of the hoses. If the flow meters are identical, the readings from each flow meter will vary in the same fashion from powder to powder as the conditions of the powder change, and only the readings of the in-line flow meters relative to each other will be needed to measure the amount of flow through each supply hose. Thus, the load cell in effect constantly recalibrates the flow meters as a group as the conditions of the powder change.

It is thus possible to use one gravimetric system in conjunction with a multiple gun powder coating system using a single in-line flow meter in the supply hose to each spray gun. The load cell measures the weight of the main feed hopper as the conditions of the powder change, while the venturi flow meters indicate the relative flow rate from each spray gun. From this, a calibration factor is derived that compensates for changes in the properties of the powder.

Since the same powder having the same physical properties flows through all of the supply hoses, the in-line flow meters determine the portion of the total flow through each supply hose regardless of overall changes in the powder properties. The accuracy of the in-line flow meters is constantly corrected by the gravimetric device associated with the powder supply. The actual weight of the powder flowing through each supply hose and dispensed by each spray gun is determined by distributing the total weight measured by the gravimetric device among the spray guns according to the proportion determined by each gun's flow meter.

While the invention has specific application to venturi flow meters, it has advantages with other relatively fast in-line powder flow measurement systems which are well intended to measure the flow through a single supply hose. In addition to pressure measurement systems, such as venturi flow meters, these systems include charge measurement based flow meters such as those manufactured by Auburn International of Danvers, Mass., and microwave based flow meters such as those manufactured by Endress & Hauser of Greenwood, Ind. Since these systems are generally more sensitive to the powder's properties, the provision of correction or recalibration using a gravimetric flow measurement device provides advantages when combined with such systems.

In addition to accommodating multiple flow meters of any type which measure the flow of through multiple supply lines from a common source. The system of the present invention can also accommodate various types of flow measurement systems associated with the common source. Preferably the single and more accurate, but slower, measurement system, is a weight loss measurement system, but it can be another measurement system such as a positive displacement system, e.g. a screw feeder, which accurately determines the total amount of powder fed to the multiple supply hoses. These other flow measurement systems are generally large, complex and often slow, making them unsuitable for use with a single spray gun, but they can be readily incorporated into the main flow indication device used with the present invention.

The system of the present invention also provides for periodic replenishing of the feed hopper through an interconnected supply hopper. The supply hopper includes a valve which can be operated to dump batches of powder from the supply hopper to the feed hopper as needed. The supply hopper may also be connected to a collection hopper in the spray booth, so that oversprayed powder can be recovered and reused. A cyclone separator can then be used to extract the oversprayed powder from the air flow and return the powder to the supply hopper.

Preferably, the present invention uses a specially designed venturi flow measurement device to provide more accurate in-line mass flow rate measurements. The venturi device of this invention uses the pressure drop between the inlet and the beginning of the throat and the pressure rise between the inlet and the end of the throat. Flow rate calculations are based on these two pressure measurements, the first being a strong function of the air mass flow rate and the other being a strong function of the powder mass flow rate. The first pressure measurement, the drop between the inlet and the beginning of the throat, is primarily a function of the air mass flow rate and is not as greatly affected by the powder flow rate, because the increase in the velocity of the two-phase flow occurs fast enough so that the powder particles, which have much greater inertia, will not accelerate as fast as the air. The air is accelerated so rapidly that a substantial amount of the powder cannot follow it, and the resulting pressure drop is measured before the powder has a chance to catch up. Since the maximum venturi entrance angle is based on limiting impact fusion, it can be made much larger than the exit angle which must be small enough to prevent separation at the wall. At the entrance a much faster change in air velocity can be obtained and therefore a pressure change which is less affected by the powder. By using the pressure drop from the entrance to the beginning of the throat, with as large an entrance angle as practical, a more accurate indication of air flow is obtained. The second pressure measurement, the rise between the inlet and the end of the throat, captures the effect of the powder particles, since the change in the velocity of the two-phase flow by the time it reaches the end of the throat has occurred for a long enough time that the velocity of the powder particles approaches the free stream velocity of the air assuming that the throat is long enough.

The accuracy of the flow rate calculated is dependent upon the accuracy of the differential pressure measurements. To improve accuracy and reliability, the present invention provides an in-line venturi flow meter which has an elongated, substantially straight inlet tube. This inlet tube tends to create a more stable flow into the venturi such that there is a more uniform distribution of the powder within the flow which improves the accuracy of the pressure measurements. With the inlet tube, the connecting hose to the venturi could bend or be moved which would affect pressure measurements. The present invention also includes a valving system to allow the venturi pressure sensing ports to be periodically back purged. This back purging assures that the sensing ports are cleared of accumulations of powder and prevents the ports from clogging or closing which could adversely affect pressure measurements. During the purge cycle each pressure transducer is also vented to atmosphere so that its zero calibration can be checked and readjusted. This also provides for more accurate pressure measurements. The valving system associated with the venturi flow meters of this invention also has the capability of automatic calibration adjustment of both the zero and the gain for each pressure transducer.

These and other advantages are provided by the present invention of a system for monitoring the flow rate of particulate material entrained within an air stream. The system includes a feed hopper containing a supply of the particulate material. A pump draws the particulate material from the feed hopper and transports the particulate material with the air stream through a hose which is connected to a spray gun. A flow monitor is associated with the hose and monitors the flow of the particulate material through the hose to provide a first flow indication. A device is associated with the feed hopper and measures the change in weight of the feed hopper over a predetermined interval to provide a second flow indication. A flow indicating device has electrical inputs which are connected to receive the first and second flow indications from the flow monitor and the weight measuring device, respectively.

DETAILED DESCRIPTION OF THE PREFERRED EMBODIMENT

Figure 1:
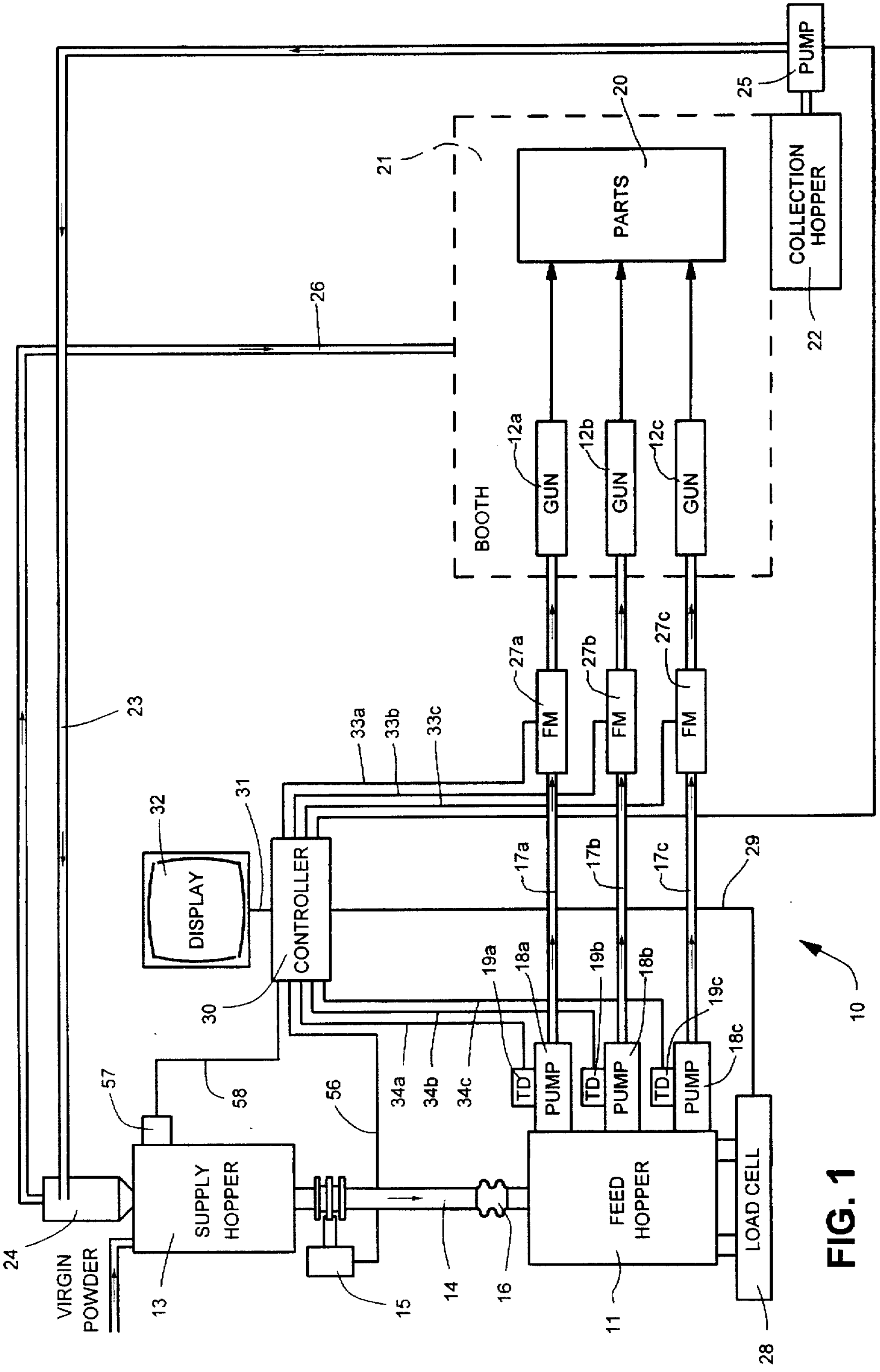
FIG. 1 is a schematic diagram of the system of the present invention.

Referring more particularly to the drawings and initially to FIG. 1, there is shown a system 10 according to the present invention for monitoring flow rates. The system 10 is shown with reference to a powder coating system in which powder is supplied from a feed hopper 11 to a plurality of powder spray guns 12*a*, 12*b* and 12*c*. The feed hopper 11 is a fluidized bed feed hopper, such as that shown in U.S. Pat. No. 5,018,909 the disclosure of which is hereby incorporated by reference in its entirety. Powder is supplied to the feed hopper 11 from a supply hopper 13 located above the feed hopper through a supply hose 14. A valve 15 is located at the bottom of the supply hopper 13 to control the flow of material from the supply hopper into the feed hopper. A suitable valve may be a butterfly valve such as that available from Lumaco of Hackensack, N.J. The bottom end of the supply hose 14 is connected to the feed hopper 11 by a flexible coupling 16. Powder from the feed hopper 11 is mixed with conveying air and is transported through supply lines 17*a*, 17*b* and 17*c* by means of pumps 18*a*, 18*b* and 18*c* to the spray guns 12*a*, 12*b* and 12*c*, respectively. A voltage-to-pressure transducer 19*a*, 19*b* and 19*c* may be associated with each of the pumps 18*a*, 18*b* and 18*c*, respectively. The voltage-to-pressure transducers 19*a*, 19*b* and 19*c* are explained in more detail below. The powder is sprayed onto parts 20 by the spray guns 12*a*, 12*b* and 12*c* in a spray booth 21. The illustrated embodiment thus includes many elements common to many powder coating systems, including a fluidized feed hopper containing a supply of coating powder, pumps, and a plurality of spray guns in a spray booth.

The system depicted in FIG. 1 also includes components for reusing over-sprayed powder. The oversprayed powder in collected in a hopper 22 located in the spray booth 21. The hopper 22 is connected by a line 23 to a cyclone separator 24 mounted atop the supply hopper 13 to allow the powder collected in the hopper 22 to be pumped to the cyclone separator by a pump 25. The mini cyclone separator 24 may be similar to that disclosed in U.S. Pat. No. 4,710,286, the disclosure of which is hereby incorporated by reference in its entirety. The cyclone separator 24 separates the powder from the transport air, drops the powder into the supply hopper 13 and exhausts the air from the top of the separator through a vent hose 26 which is connected to the spray booth 21.

Flow monitors are provided in the form of flow meters 27*a*, 27*b* or 27*c*, one of which is located in each of the supply lines or hoses 17*a*, 17*b* and 17*c* and is associated with each of the spray guns 12*a*, 12*b* or 12*c*, respectively. Each of the flow meters 27*a*, 27*b* and 27*c* is used to provide an initial reading of the amount of powder being sprayed by the associated gun 12*a*, 12*b* or 12*c* . While any type of in-line flow meter can be used, the preferred flow meter is a venturi-type pressure sensing flow meter. The preferred venturi flow meter for use with this invention will be described hereinafter in detail in association with FIGS. 4–6.

In accordance with the conventional operation of a powder spray system, powder is drawn from the feed hopper 11 by means of the pumps 18*a*, 18*b* and 18*c* and pumped through the supply lines 17*a*, 17*b* and 17*c* to the spray guns 12*a*, 12*b* and 12*c* where the powder is sprayed onto parts 20 to be powder coated. The flow rate of the powder to each of the spray guns 12a, 12b and 12c is measured by the associated venturi flow meters 27a, 27b and 27c. However, as discussed above, the venturi flow meters, and other commonly used in-line flow meters, do not always accurately measure the mass flow rate of air-entrained powder due to the inherent difficulties in measuring the mass flow rate of powder entrained within a conveying air flow.

In accordance with the present invention, the feed hopper 11 is associated with a gravimetric measuring device. Preferably, the feed hopper 11 is supported on top of a load cell 28 containing suitable load measuring devices. A suitable load cell, for example, is a Model AWS3000 load cell manufactured by AccuRate, Inc. of Whitewater, Wis. The flexible coupling 16 by which the supply hose 14 is connected to the feed hopper 11 isolates the weight of the supply hopper 13 from the load cell measurement. The load cell 28 provides a voltage output which represents the weight of the feed hopper 11 including the powder contained therein. The load cell 28 is connected by an electrical line 29 to a flow indicating device which is in the form of a controller 30, which may include a programmed microcomputer or PC and various associated interfaces and control devices, as are well known in the art. The controller 30 is, in turn, connected by a line 31 to a suitable display 32, such as a monitor. Each of the flow meters 27a, 27b and 27c is connected to the controller 30 by electrical lines 33a, 33b and 33c. The controller 30 uses the readings of each of the flow meters 27a, 27b and 27c to provide an initial measurement of mass flow rate, and corrects the flow meter readings using the readings of the load cell 28. Each of the sensors 19a, 19b and 19c may also be connected to the controller 30 by electrical lines 34a, 34b and 34c.

Preferably, load cell readings are taken at regular time intervals. It has been found that obtaining load cell readings at intervals of one minute is suitable for many applications, since one minute is the time that it typically takes to coat one part in a powder coating system. By dividing the decrease in weight measured by the load cell by the time interval, an accurate average flow rate over the time interval can be calculated. This average flow rate is then used to calculate a correction factor to correct the readings received from the flow meters 27a, 27b and 27c. For example, if the sum of all of the flow meters 27a, 27b and 27c indicates a total mass flow rate of 10.0 lbs/hr over the time interval, while the load cell indicates that the actual mass flow rate was 10.1 lbs/hr, the flow meter readings are corrected by multiplying the flow rates measured by the flow meters by a correction factor, in this case 1.01. For the remainder of the following load cell time interval, the flow meter readings are multiplied by this correction factor to provide a more accurate reading. After another load cell time interval, the load cells provide another correction factor which is then used to correct flow meter readings during the then-current load cell time interval. This cycle repeats itself to provide continuously an updated correction factor by which the current flow meter readings are multiplied before the flowmeter readings are displayed or used to control the system as will later be described.

While the load cell generally provides a more accurate measurement than the flow meters, the accuracy of the load cell can be enhanced by increasing the time interval between measurements since increasing the time interval tends to filter out transients. Also, it is possible that any single load cell reading may be inaccurate due to transients in the load cell or bumping of the feed hopper or other factors. Therefore, it is preferred that a number of load cell readings be used to calculate the mass flow rate instead of a single reading. For example, an average of the last 10 calculated correction factors can be used to provide the actual correction factor applied to the flow meter readings. This minimizes the inaccuracy of any single load cell reading and provides a longer time interval for the load cell readings. Likewise, the current value for the sum of all flow meter readings can also be averaged to filter out transients. Thus, the sum value which is used with the load is cell value to obtain the correction factor could be a running average of the last 15 sum values, for example.

The correction factor which is applied to the flow meter readings is preferably a simple ratio of the measured flow rate using the load cell readings divided by the sum of the flow meter readings. This provides for a linear correction factor. In the present embodiment, it has been found that a simple ratio provides sufficient accuracy, so that more complicated curve matching corrections are unnecessary. However, depending upon the type of in-line flow meters used and the type of two-phase material being transported, more complicated correction schemes may be necessary.

With multiple in-line flow meters, such as shown in the present embodiment, each of the flow meters 27a, 27b and 27c should be identical so that they vary in the same fashion from powder to powder and as the condition of the powder changes. The single load cell measurement is used with the sum of the measurements of all of the in-line flow meters to provide the correction factor. The correction factor is then applied universally to all of the in-line flow meters. Alternatively, if the flow meters are not all the same, the flow meters can be calibrated so that each flow meter produces the same reading for a given powder flow rate, and in this manner the benefits of the invention can still be achieved.

Figure 2:
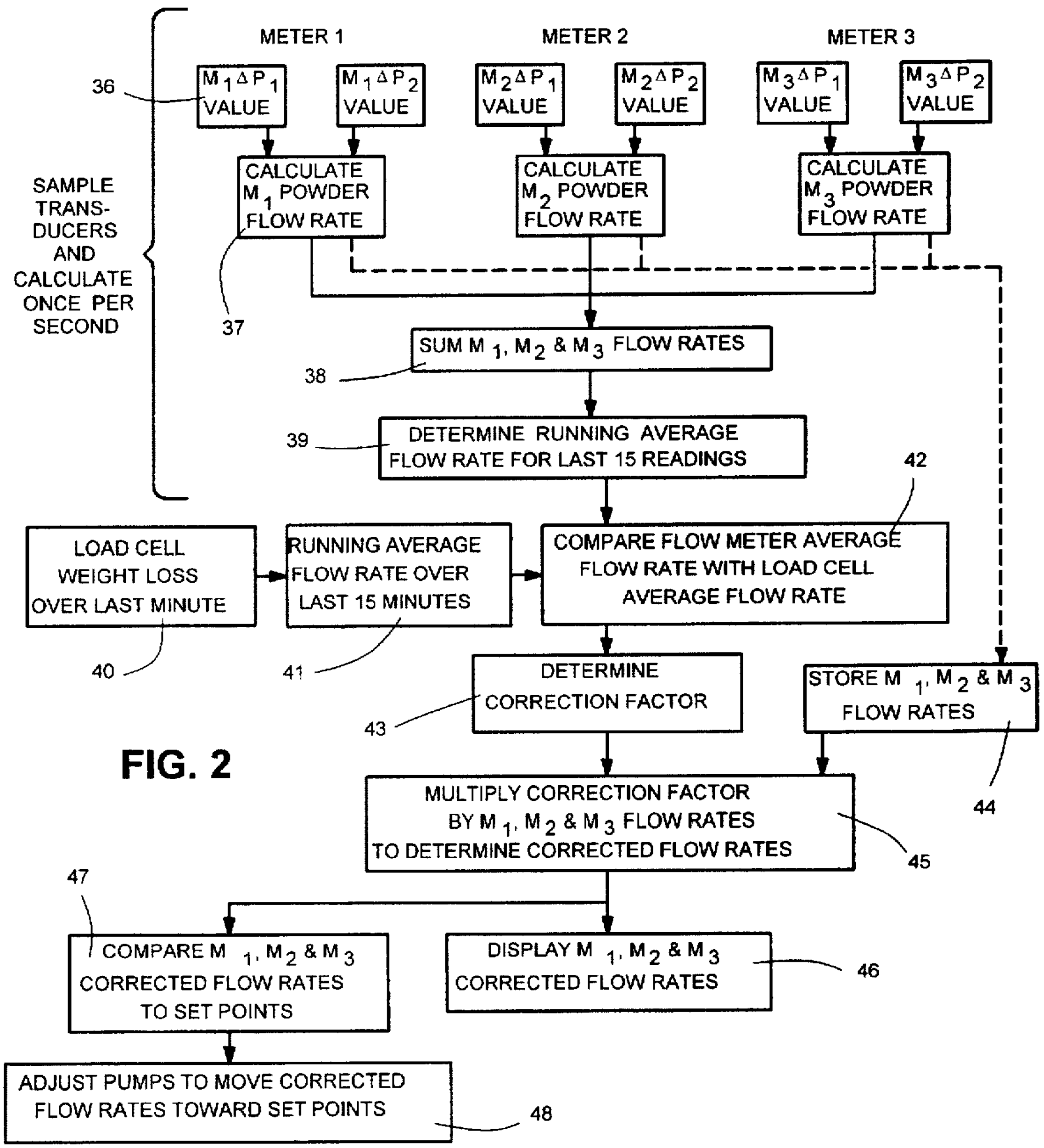
FIG. 2 is a schematic diagram of the operations of the controller according to the correction factor method.

The operations of the controller 30 in the performance of this correction factor method are shown in FIG. 2. As shown in FIG. 2, at step 36 two pressure differential measurements, $\Delta P_1$ and $\Delta P_2$, are measured for each flow meter, 27a, 27b and 27c, or $M_1$, $M_2$ and $M_3$, respectively, and a powder flow rate is derived for each flow meter, in accordance with known mathematical relationships. For example, the mathematical formulae used may be those contained in Energy International, Inc. Report No. 938R325, entitled "Development of An Extended Length Venturi Meter for Gas/Solid Flows," prepared for the National Science Foundation, and dated March 1992. After the three powder flow rates are obtained they are stored for later use at step 44, and they are added together to obtain a total powder flow rate at step 38. A total powder flow rate is also obtained for the most recent 15 readings at step 39 by averaging the total powder flow rate just obtained with the last 14 readings. Each of the operations in steps 36–39 are performed once each second.

The weight loss experienced by the load cell 28 over the last minute is measured at step 41), and from this, a running average of the last 15 measurements is calculated at step 41. This average load cell flow rate from step 41 is compared with the average meter flow rate from step 39 at step 42, and from this comparison a correction factor is obtained at step 43. The flow rates from each meter stored at step 44 are multiplied by this correction factor at step 45 to determine the corrected flow rates for each meter. The corrected flow rates obtained at step 44 are output to the display 32 at step 46. The corrected flow rates are also compared to the pump set points for each supply line at step 47. If the corrected flow rates vary from the set points, the rate of the pump 18a, 18b or 18c associated with that flow meter is adjusted at step 48 to move the corrected flow rates toward the set points.

Figure 3:
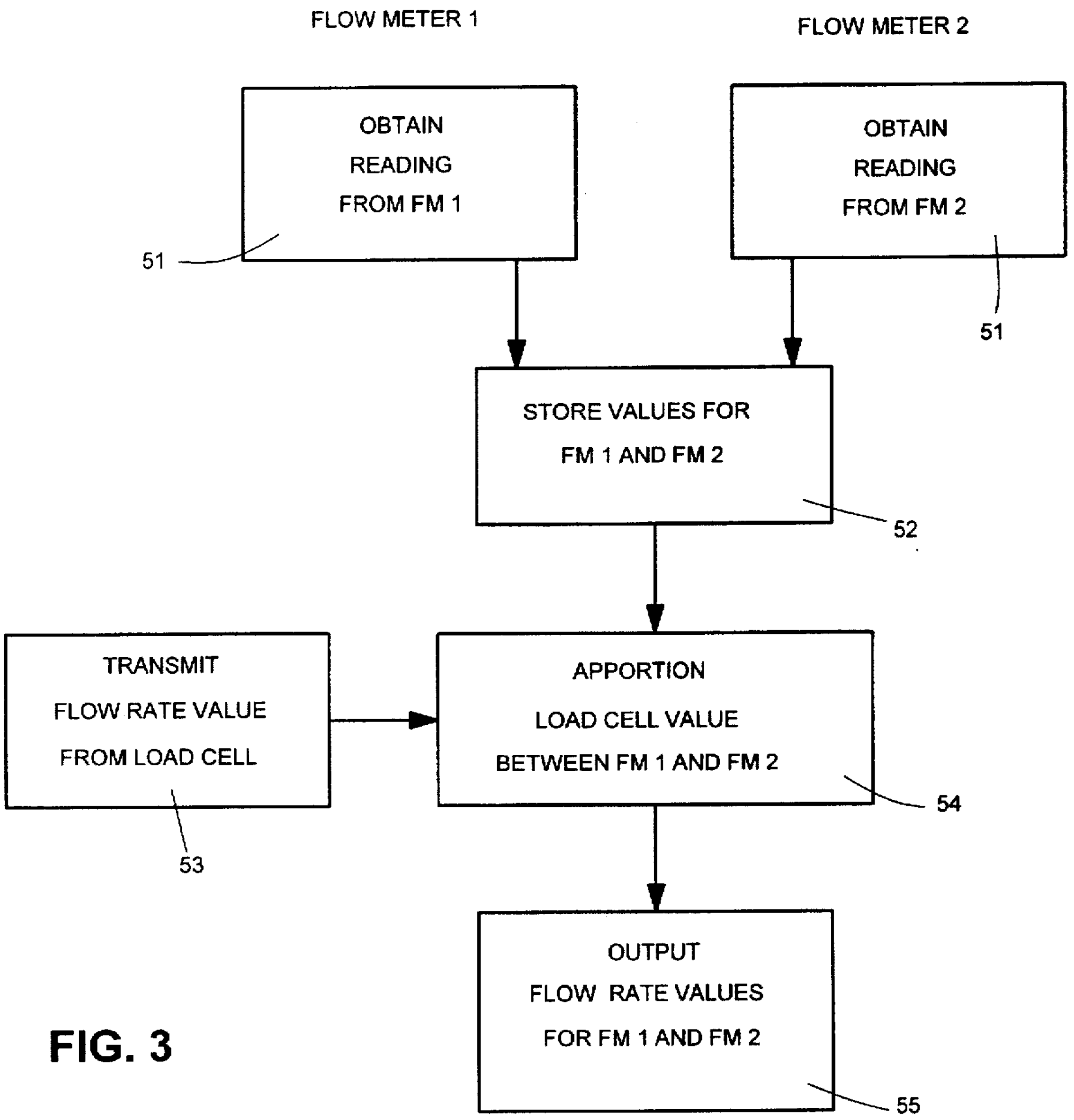
FIG. 3 is a schematic diagram of the operations of the controller according to the apportioning method.

Utilizing the teachings of the present invention, the more general apportioning method shown in FIG. 3 could also be used. The method of FIG. 3 is illustrated for two flow meters FM 1 and FM 2. At step 51, the flow rates values $V_1$ and $V_2$ are determined for each flow meter. The flow rate values are then stored at step 52. The flow rate derived from the weight loss of the load cell 28 is transmitted at step 53, and at step 54, the load cell flow rate is apportioned between the two flow meters. From this apportionment, flow rate values for each load cell are output to the display 32 at step 55.

According to the method of the present invention, if the flow meters are identical or are calibrated to be identical, the values would be derived from each flow meter representative of the powder flow through that meter. These values are then be stored and processed with the current measured load cell flow rate value to apportion the measured value between the flow meters. For example, if there are two supply lines and a flow meter FM 1 and FM 2 in each supply line as shown in FIG. 3, and if the first meter has a reading of two times that of the other meter, then two-thirds of the flow is going through the supply line in which the first flow meter was located. If, in addition, the load cell indicates the total flow rate through both supply lines to be 15 lbs/hour, then 10 lbs/hour is flowing through the supply line in which the first flow meter was located and 5 lbs/hour is flowing through the other supply line. As long as the flow meters are identical, they will vary in the same fashion from powder to powder, and only relative readings of the flow meters to each other are needed to determine the flow rate through each supply line.

In-line flow meters, such as venturi flow meters 27*a*, 27*b* and 27*c* used in the present embodiment, have been precalibrated in the past using conventional techniques, such as flowing powder through the lines for a predetermined interval and capturing the powder dispensed by one of the guns 12*a*, 12*b* and 12*c* in a collection bag, and weighing the amount of powder in the collection bag. Each of the guns must be run in this manner, and the guns must be run one at a time to compare each gun individually against the weight reading. While this precalibration technique can be used with the present invention, the invention allows for automatic calibration which would eliminate such precalibration techniques. The automatic calibration can be accomplished by running each gun in the system 10 for a predetermined period of time, for example, 15 minutes, during which the load cell would determine the amount of powder dispensed by the gun. Using the load cell readings, the flow meters can be initially calibrated without capturing the output of the guns and weighing the captured powder. The load cell readings can, thereafter, be used to update or correct the calibration in accordance with the invention.

The feed hopper 11 is periodically refilled with batches of powder from the supply hopper 13. The feed hopper is supplied with a batch of powder from the supply hopper 13 by opening the valve 15 located at the bottom of the supply hopper, allowing powder to flow through the supply hose 14. The valve 15 is preferably pneumatically operated and is connected by a pneumatic line 56 to a suitable solenoid connected to the controller 30. The controller 30 uses the weight reading of the load cell 28 to determine when it is necessary to refill the feed hopper 11 and opens the valve 15 to refill the feed hopper accordingly. When the feed hopper 11 is refilled, there is a discontinuity in the series of measured weight readings of the load cell 28, so that it is not possible to use the load cell readings to determine the flow rate. When this occurs, the measured flow rate from the load cell measurement is ignored, and the last flow rate calculation is used temporarily until the next load cell measurement is obtained.

The supply hopper 13 also includes a high-level sensor 57 which senses when the hopper 13 is full. The high-level sensor 57 is connected by means of suitable electrical lines 58 to the controller 30 to prevent the supply hopper 13 from being overfilled with powder from the cyclone separator 24. The controller 30 controls the operation of the pump 25 and stops the flow of oversprayed powder to the separator 24 if the supply hopper 13 is full.

Figure 4:
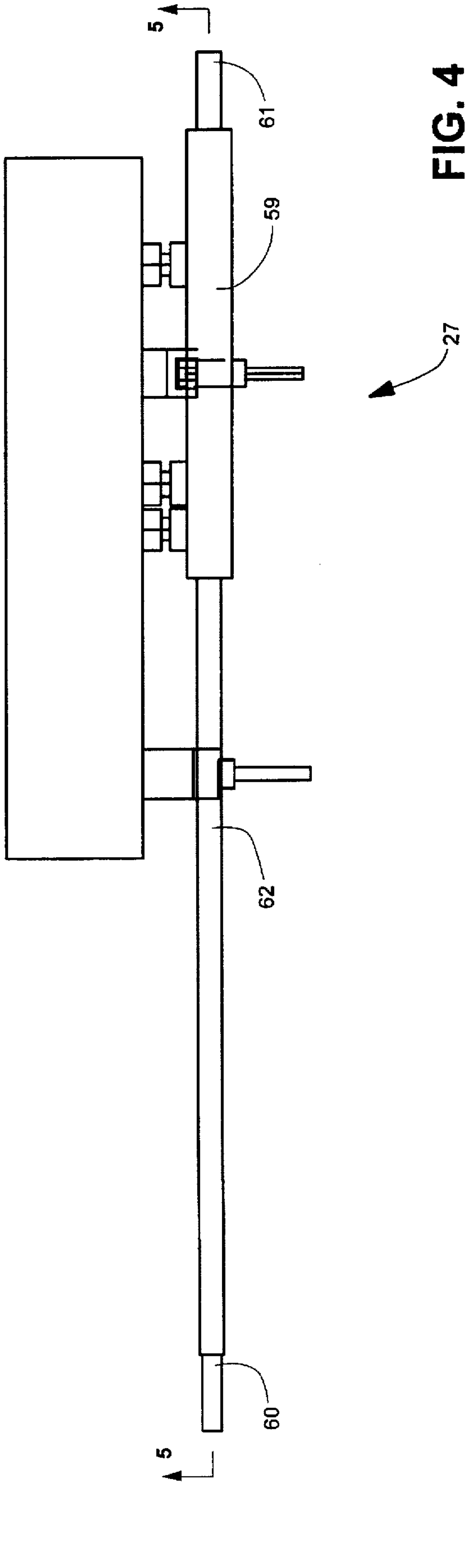
FIG. 4 is a plan view of one of the flow meters of the present invention.
Figure 5:
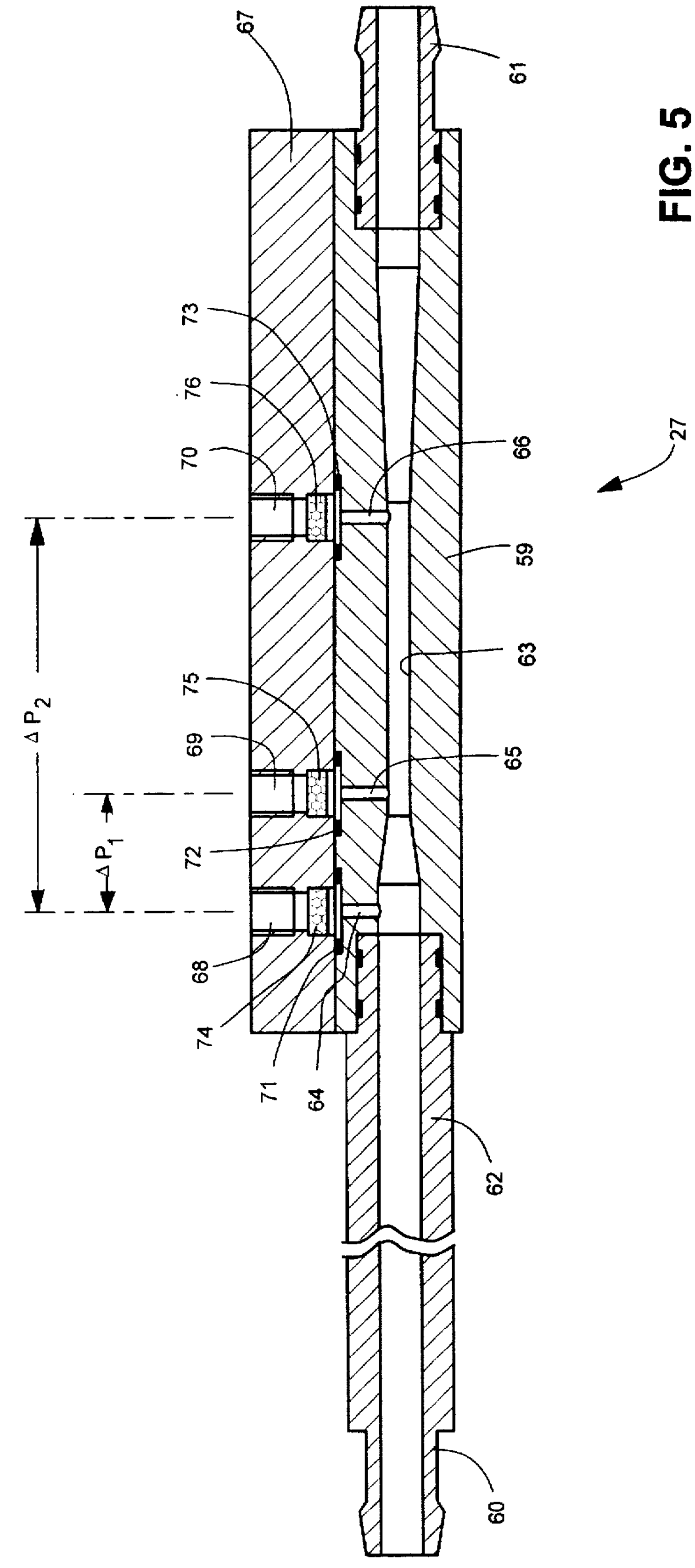
FIG. 5 is a cross sectional view of portion of one of the flow meters taken along line 5—5 of FIG. 4.

The preferred structure for the venturi portion of each of the flow meters 27*a*, 27*b* and 27*c* is illustrated in FIGS. 4 and 5. The flow meter comprises a venturi block 59 having an inlet connection 60 at one end and an outlet connection 61 at the other end. The inlet connection 60 of the block 59 is connected to an elongated, substantially straight inlet tube 62. Between the inlet connection 60 and the outlet connection 61 is a flow passageway having a venturi or constricting throat portion 63. Three smaller diameter orifices intersect the flow passageway to provide pressure taps 64, 65 and 66. The first pressure tap 64 is located upstream of the venturi throat portion 63, the second pressure tap 65 is located at the upstream end of the throat portion 63, and the third pressure tap 66 is located at the downstream end of the throat portion 63. Each of the taps 64, 65 and 66 extend through the block 59 to a mounting block 67 attached to the side of the venturi block 59, where they connect to connecting passageways 68, 69 and 70, respectively. Each of the passageways is sealed to one of the taps in the block by a suitable sealing ring 71, 72 and 73. A porous plastic filter 74, 75 or 76 is located at the end of each of the connecting passageways 68, 69 and 70, respectively, to prevent powder from entering the passageway.

Unlike most venturi pressure measurement devices of the prior art, the preferred flow meter provides an elongated throat and measures the pressure at the inlet, at the beginning of the throat and at the end of the throat. The flow meter then uses the pressure drop $\Delta P_1$ between the inlet and the beginning of the throat and the pressure drop $\Delta P_2$ between the inlet and the end of the throat, and all of the flow rate calculations are based on these two pressure differential measurements. The first pressure differential measurement $\Delta P_1$ is a strong function of the air mass flow rate, while the other pressure differential measurement $\Delta P_2$ is a strong function of the powder mass flow rate. The first pressure measurement $\Delta P_1$, which is more strongly a function of the air mass flow rate, is not as affected by the mass flow of the powder because the two-phase flow is rapidly accelerated as it enters the constriction. The change in the velocity of the two-phase flow occurs rapidly enough so that the powder particles, which have much greater inertia, cannot accelerate at the same rate as the air. The second pressure measurement $\Delta P_2$ captures the effect of the powder particles, because the change in velocity occurs for a long enough time to allow the velocity of the powder particles to approach the free stream velocity of the air.

To assure that the first pressure differential measurement $\Delta P_1$ is primarily dependent on air mass flow and not powder, the air flow should be accelerated rapidly enough so that a substantial amount of the powder in the flow cannot follow it, and the resulting pressure drop should be measured before the powder has a chance to catch up. Since the maximum venturi entrance angle is based on limiting impact fusion, it can be made much larger than the venturi exit angle which must be small enough to prevent separation of the flow at the wall. A much faster change in air velocity can be obtained at the throat entrance, and therefore a pressure change can be created which is less affected by the powder. By using the pressure drop from the entrance to the beginning of the throat, with as large an entrance angle as practical, a more accurate indication of air flow can be obtained.

The substantially straight inlet tube 62 which is connected to the inlet 60 of the venturi block 59 straightens the flow of powder as it flows into the venturi. The resulting flow is more stable, and the powder distribution in the flow is more uniform, resulting in more accurate and reliable readings by the flow meter. Without the presence of the straight inlet tube 62, a bent hose could be connected to the inlet of the venturi block which could cause a more uneven distribution of the powder within the flow in the venturi block, affecting the pressure readings, or temporary movement of the hose at the inlet could cause the flow meter readings to vary widely. The inlet tube 62 should have a substantial straight length to provide stable or uniform flow. Preferably, the length of the tube 62 should be at least ten times the internal diameter of the tube.

Since the accuracy of the calculated mass flow rate is highly dependent upon the accuracy of the differential pressure measurements, the present invention also provides a valving system as part of the venturi flow meter which can be used to back purge periodically the venturi pressure sensing ports for the pressure sensors. The pressure sensors are preferably pressure transducers. This valving system allows both sides of the differential pressure transducers to be connected to atmosphere so that their zero offset can be set.

Figure 6:
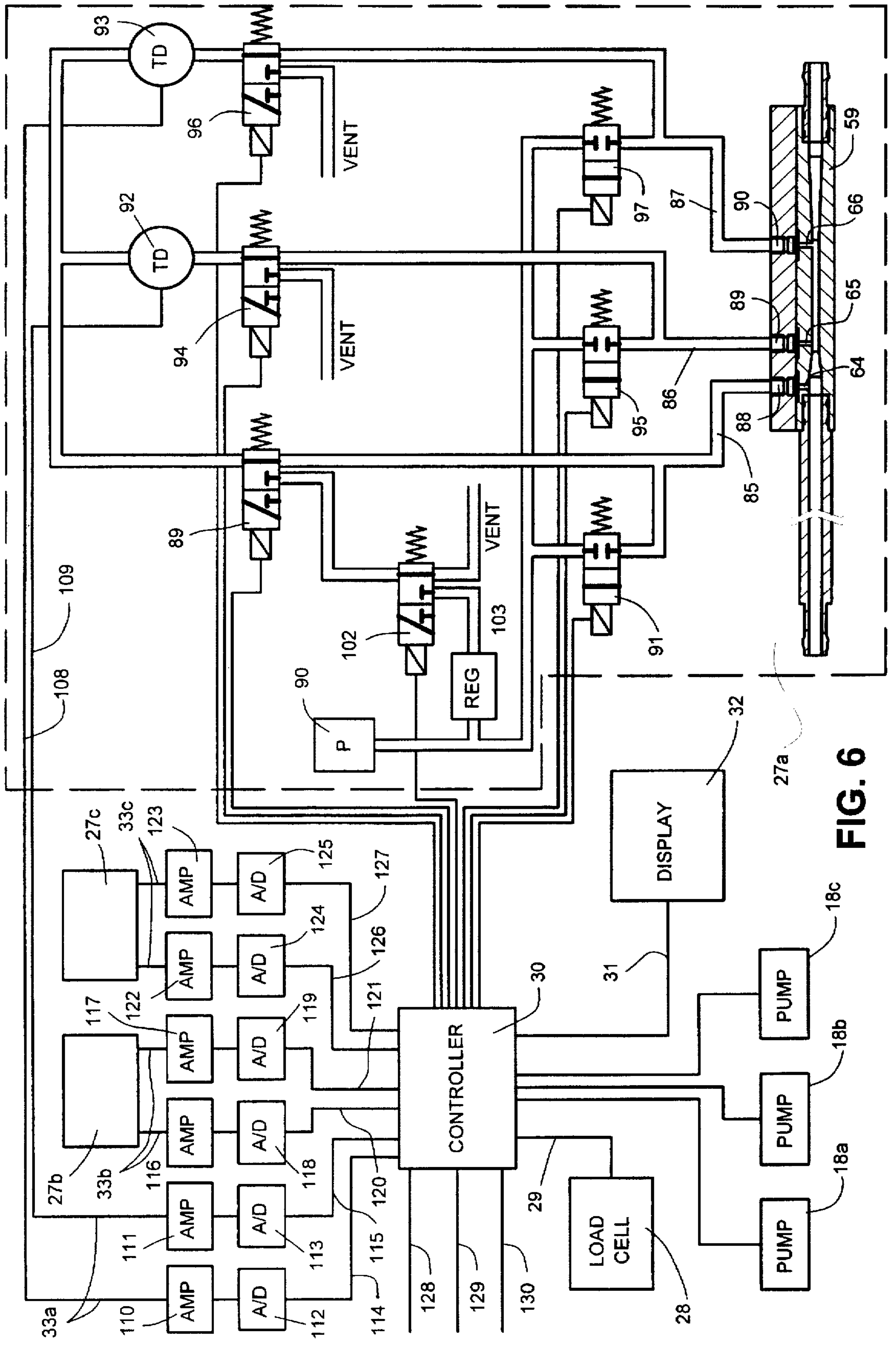
FIG. 6 is a schematic diagram of the flow meter of FIGS. 3 and 4 and the associated control system.

FIG. 6 shows the flow meter 27*a* which includes the venturi block 59 with pressure lines 85, 86 and 87 connected to the connecting passageways 68, 69 and 70, respectively. The first line 85 is connected to one side of differential pressure transducers 92 and 93 through a normally-open solenoid valve 89. The first line 85 is also connected to a supply 90 of pressurized air through a normally-closed solenoid valve 91. The second line 86 is connected through a normally-open solenoid valve 94 to the other side of the differential pressure transducer 92. The second line is also connected through a normally-closed solenoid valve 95 to the pressurized air supply 90. The third line 87 is connected through a normally-open solenoid valve 96 to the other side of the differential pressure transducer 93. The third line 87 is also connected through a normally-closed solenoid valve 97 to the pressurized air supply 90.

During normal flow measurement operation, the solenoid valves 89, 94 and 96 are open and the solenoid valves 91, 95 and 97 are closed, so that the pressure lines 85, 86 and 87 are connected to the pressure transducers 92 and 93. The valving design also permits automatic zero adjustment of the pressure transducers to be made by the controller 30 during a period when the spray guns are off. To zero the transducers 92 and 93, the solenoid valves 89, 94 and 96 are energized to vent both sides of the differential pressure transducers 92 and 93 to atmosphere. Both pressure transducers 92 and 93 are then at a zero level, and the voltage levels from each of the transducers can be read and stored by the controller to be used to subsequently correct the voltage level readings.

To purge each of the pressure taps of accumulated powder, pressurized air from the air supply 90 is supplied through the pressure lines 85, 86 and 87. This purging operation is accomplished by first energizing the solenoid valves 89, 94 and 96 so that these three valves are closed as described above, and by energizing the solenoid valves 91, 95 and 97 to open these valves. Air from the supply 90 flows through the lines 85, 86 and 87 and through the taps 64, 65 and 66 in the venturi block 59 to force out any powder that may have accumulated in the taps, so that the taps remain clean. To assure that the purge air pressure is prevented from pressurizing the transducers 92 and 93, the solenoid valves 91, 95 and 97 should always be energized after the valves 89, 94 and 96 are energized, and the solenoid valves 91, 95 and 97 should always be de-energized before the solenoid valves 89, 94 and 96 are de-energized. The automatic purge sequence and the zeroing sequence can be performed at any desired intervals, and the timing of these sequences will vary depending upon sample time and purge time requirements. Typical values for operation a powder coating system may be a 15 second pressure measurement period followed by a 0.5 second purge and autozero period.

The design of the flow meter 27*a* also permits the automatic adjustment of the gain for each pressure transducer to assure more accurate pressure readings and thus provide a more accurate mass flow rate measurement. During the purge cycle each transducer 92 and 93 is first vented to atmosphere by energizing the valves 89, 94 and 96 and then one side of each transducer is connected a known calibration pressure. Since most of the transducers which are typically used for this application are linear, a single calibration pressure near the operating pressure is adequate. A typical calibration pressure would be, for example, 1 psi. The gain would then be set for each at a higher or lower voltage level for the 1 psi pressure if desired. It is only necessary that the gain of each transducer be set so that all transducers for all flow meters produce the same output voltage for the known calibration pressure.

With reference to FIG. 6, therefore, both sides of the differential pressure transducers 92 and 93 would first be connected to atmosphere by energizing the valves 89, 94 and 96. The output of each of the transducers 92 and 93 would then be adjusted so that it reads zero volts since there would be zero differential pressure across each of the transducers. A valve 102 which is connected to the vent line from the valve 89 is then be energized to move it from the vent position shown in FIG. 6 to connect one side of the transducers 92 and 93 to a regulator 103 which is connected to the air supply 90 and which supplies air at a regulated pressure of 1 psi, for example. Therefore, 1 psi of pressure would be present at the one side of the transducers 92 and 93 (the top side shown in FIG. 6). Since the other side of the transducers 92 and 93 (the bottom side shown in FIG. 6) is still connected to atmosphere, a 1 psi differential would be present across both transducers 92 and 93. The output of the transducers 92 and 93 can now be set at 5 volts, for example, and this 5-volt reading would represent 1 psi. The same technique can be used for all three flow meters 27*a*, 27*b* and 27*c*.

When used in conjunction with the loss in hopper weight system, it is only necessary that all the venturi flow meters be calibrated alike, and absolute accuracy of the flow meters is less critical since the flow meter measurements will be periodically adjusted and re-calibrated using the load cell readings. Thus the calibration pressure which is used need not be exact, but the same pressure must be applied to all of the transducers for all of the venturi flow meters supplied by the feed hopper. This allows for a simplified calibration pressure system, with only single regulator and solenoid valve per hopper system.

With further reference to FIG. 6, the outputs of the transducers 92 and 93 of the first flow meter 27*a* are connected by means of electrical lines 108 and 109 to amplifiers 110 and 111 and analog-to-digital (A/D) converters 112 and 113 to provide digital inputs 114 and 115 into the controller 30 which are representative is of the outputs of the transducers 92 and 93, respectively. The electrical lines 108 and 109 thus comprise the electrical lines 33*a* shown in FIG. 1. Similarly, the electrical lines 33*b* from the two transducers of the second flow meter 27*b* are connected to amplifiers 116 and 117 and A/D converters 118 and 119 to provide digital inputs 120 and 121 to the controller 30, and the electrical lines 33*b* from the two transducers of the third flow meter 27*c* are connected in the same way to amplifiers 122 and 123 and A/D converters 124 and 125 to provide two inputs 126 and 127 to the controller 30. Each pair of inputs is utilized by the controller 30 to calculate a flow rate representative of the associated flow meter. Then, as shown in FIG. 2, the calculated flow rates from the meters 27*a*, 27*b* and 27*c* are summed and the current running average is determined. This value is then processed with the measured value from the load cell 28, which is also a running average, in order to provide a correction factor. This correction factor is then multiplied by the calculated flow rates for the flow meters 27*a*, 27*b* and 27*c* to obtain corrected flow rates for the meters 27*a*, 27*b* and 27*c* . These corrected flow rates can be displayed at the display 32. They can also be compared with flow rate set points 128, 129 and 130 which can be input to the controller 30 for the pumps 18*a*, 18*b* and 18*c*, as described above with reference to steps 47 and 48 of FIG. 2. Then if, for example, the corrected flow rate for the meter 27*a* is below the desired flow rate set point 128 for the pump 18*a*, a voltage-to-pressure transducer (such as Part No. 113626A available from Nordson Corporation, Westlake, Ohio) could be used to increase the control air pressure to the pump 18*a* to increase the output of the pump until the corrected flow rate value reaches the set point value. The transducer would be the transducer 19*a* shown in FIG. 1. Similar transducers 19*b* and 19*c* could be used for the pumps 18*b* and 18*c*, respectively. Thus, if desirable, closed loop control of the powder flow can be achieved for all three pumps 18*a*, 18*b* and 18*c* and their associated flow meters 27*a*, 27*b* and 27*c*.

Figure 7:
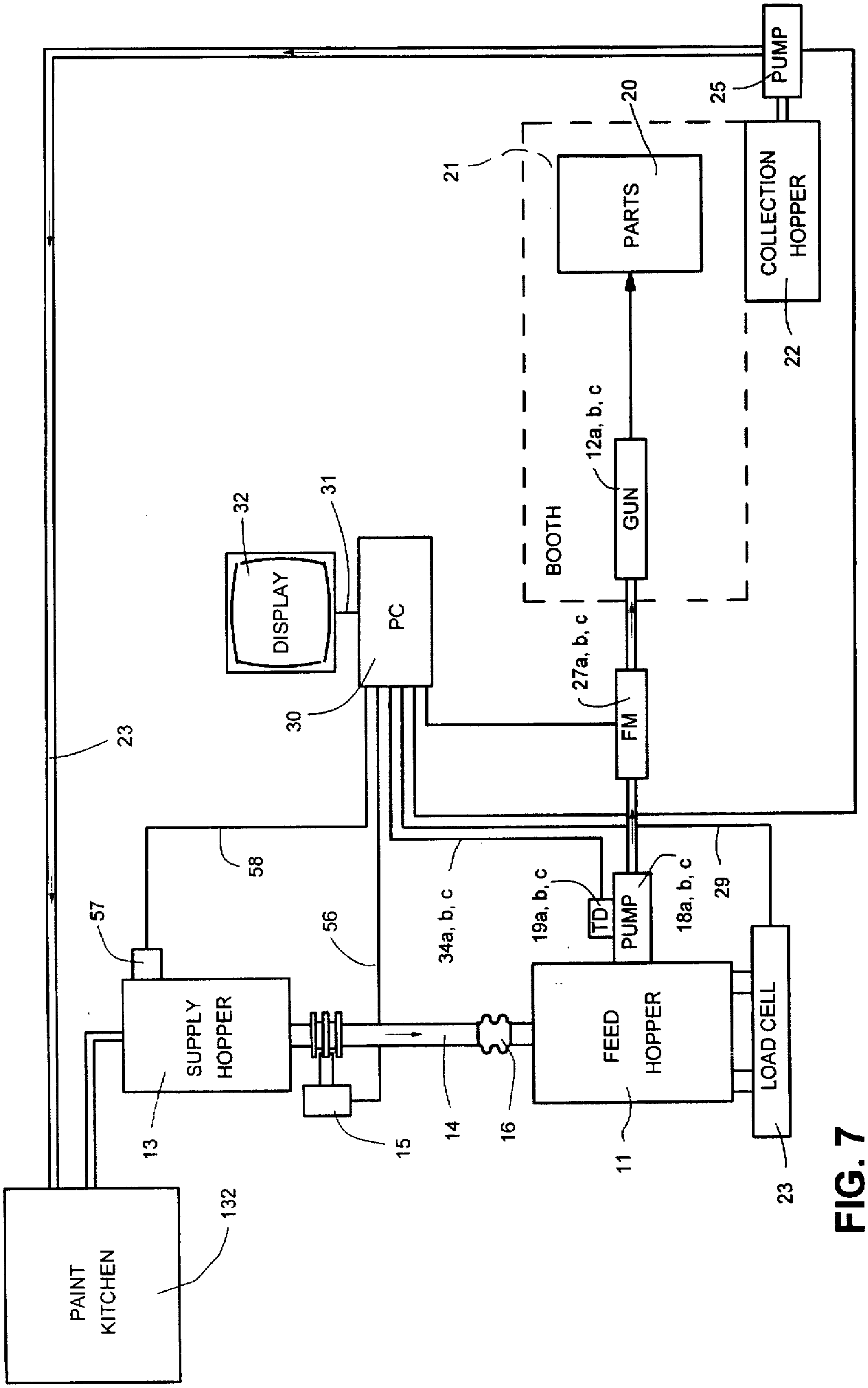
FIG. 7 is a schematic diagram similar to FIG. 1 showing an alternative embodiment for the system of the present invention.

As shown in FIG. 6, the controller 30 is also connected to each of the valves 89, 91, 94, 95, 96 and 97 of the flow meter 27*a* to control the operation of the valves during the purging and zeroing operations discussed above. Although not shown in FIG. 6, the controller 30 is connected to the corresponding valves in each of the other flow meters 27*b* and 27*c* to control the operation of those valves in the same manner Various other modifications can be made to the embodiments previously discussed. FIG. 7 shows a modified similar to that previous described with reference to FIG. 1. In FIG. 7 the oversprayed powder from the collection hopper 22 is pumped to a paint kitchen 132. New or virgin powder may also be supplied to the paint kitchen 132. The reused oversprayed powder is mixed with the virgin powder in the paint kitchen according to the needs of the particular application, and the mixture of powder is fed back to the supply hopper 13. Various techniques may be used to separate or to process the oversprayed powder in the paint kitchen 132 as is well known in the art. The powder in the supply hopper 13 Is then fed into the feed hopper 11 as previous described. While the system in FIG. 7 depicts only a single spray gun 12, it should be understood that the system may incorporate two or more spray guns with two or more flow meters 27 as previously described with reference to FIG. 1.

Other variations and modifications of the specific embodiments herein shown and described will be apparent to those skilled in the art, all within the intended spirit and scope of the invention. While the invention has been shown and described with respect to particular embodiments thereof, these are for the purpose of illustration rather than limitation. Accordingly, the patent is not to be limited in scope and effect to the specific embodiments herein shown and described nor in any other way that is inconsistent with the extent to which the progress in the art has been advanced by the invention.

What is claimed is:

1. A system for monitoring the flow rate of particulate material entrained within an air stream, which comprises:

a feed hopper providing a source of the particulate material;

a hose for conveying the particulate material within the air stream;

a pump for drawing the particulate material from the feed hopper and transporting the particulate material with the air stream through the hose;

a flow monitor associated with the hose for monitoring the flow of the particulate material through the hose and providing a first flow indication;

a device associated with the feed hopper for measuring the change in weight of the feed hopper over a predetermined time interval and providing a second flow indication; and a flow indicating device having electrical inputs connected to receive the first and second flow indications from the flow monitor and the weight measuring device, respectively, the flow indicating device including a controller which corrects the first flow indication from the flow monitor according to the second flow indication from the weight measuring device to provide a corrected flow indication.

2. A method of monitoring flow of particulate material flowing from a feed hopper through a hose to a dispenser, comprising the steps of:

monitoring the flow rate in the hose using an in-line flow meter to provide a first flow indication;

weighing the feed hopper at predetermined time intervals;

comparing the change in weight of the feed hopper over at least one of predetermined intervals to obtain a second flow indication; and comparing the first flow indication to the second flow indication to obtain a correction factor and applying the correction factor to the first flow indication to obtain a corrected flow rate, the first flow indication being provided using a venturi tube flow meter which includes pressure sensors and valving mechanisms to selectively connect the pressure sensors to atmosphere to produce a zero reading from the pressure sensors for calibration.

3. A system as defined in claim 1, wherein the controller includes a display for presenting a corrected flow indication.

4. A system as defined in claim 1, wherein the controller corrects the first flow indication by providing a linear adjustment to the first flow indication.

5. A system as defined in claim 1, wherein the controller corrects subsequent first flow indications from the flow monitor according to a correction factor obtained from comparing a past second flow indication with a comparable first flow indication.

6. A system as defined in claim 1, including two or more hoses for conveying the particulate material within the air stream and two or more flow monitors, each of the flow monitors being associated with one of the hoses and each providing a first flow indication.

7. A system as defined in claim 6, wherein the flow indicating device includes a controller for correcting the first flow indications from the plurality of flow monitors according to the second flow indication from the weight measuring device.

8. A system as defined in claim 1, wherein the flow monitor is a flow meter which measures the mass flow rate of the particulate material through the hose.

9. A system as defined in claim 8, wherein the flow monitor is a venturi tube flow meter.

10. A system as defined in claim 1, comprising in addition a supply hopper connected to supply batches of particulate material to the feed hopper.

11. A system as defined in claim 9, wherein the venturi tube flow meter includes an elongated, substantially straight inlet tube.

12. A system as defined in claim 11, wherein the inlet tube has a length which is at least ten times its internal diameter.

13. A system as defined in claim 9, wherein the venturi tube flow meter includes an elongated throat with pressure taps at at least two locations in the throat.

14. A system as defined in claim 9, wherein the venturi tube flow meter includes pressure taps and the flow meter is connected to a supply of purge air to allow gas to be forced through the pressure taps to purge the pressure taps of accumulations of particulate material.

15. A system as defined in claim 9, wherein the venturi tube flow meter includes pressure taps and filters located in each of the pressure taps.

16. A system for monitoring the flow rate of particulate material entrained within an air stream, which comprises:

a feed hopper providing a source of the particulate material;

a hose for conveying the particulate material within the air stream;

a pump for drawing the particulate material from the feed hopper and transporting the particulate material with the air stream through the hose;

a venturi tube flow meter associated with the hose for measuring the mass flow rate of the particulate material through the hose and providing a first flow indication, the venturi tube flow meter including pressure taps and filters located in each of the pressure taps, the venturi tube flow meter including pressure sensors and valving mechanisms to selectively connect the pressure sensors to atmosphere to produce a zero reading from the pressure sensors for calibration;

a device associated with the feed hopper for measuring the change in weight of the feed hopper over a predetermined time interval and providing a second flow indication; and a flow indicating device having electrical inputs connected to receive the first and second flow indications from the flow monitor and the weight measuring device, respectively.

17. A system as defined in claim 16, wherein the venturi tube flow meter includes a supply of gas at a regulated pressure, and wherein the valving mechanism selectively connects the pressure sensors to the gas supply for calibration of the pressure sensors.

18. A system as defined in claim 1, wherein the pump is connected to the controller and wherein the controller uses the corrected flow indication to adjust the pump according to a set point.

19. A system as defined in claim 1, wherein the flow indicating device includes a controller which is connected to the pump and which receives the first and second flow indications, and wherein the controller uses the first and second flow indications to adjust the pump.

20. A system as defined in claim 19, comprising in addition a voltage-to-pressure transducer associated with the pump and connected to the controller to adjust pressure to the pump and thereby to adjust the output of the pump.

21. A system as defined in claim 19, including two or more hoses for conveying the particulate material within the air stream and two or more flow monitors, each of the flow monitors being associated with one of the hoses and each providing a first flow indication.

22. A powder coating system, which comprises:

a spray gun for spraying the powder onto a workpiece;

a feed hopper providing a source of powder;

a hose for conveying the powder material within an air stream;

a pump for drawing the particulate material from the feed hopper and transporting the particulate material with the air stream from a pump output through the hose;

a flow meter associated with the hose for monitoring the flow rate of the powder through the hose and providing a first flow indication;

a device associated with the feed hopper for measuring the change in weight of the feed hopper over a predetermined interval and providing a second flow indication; and a controller which is connected to the pump and which receives the first and second flow indications, the controller using the first and second flow indications to adjust the output of the pump.

23. A system as defined in claim 22, comprising in addition a supply hopper connected to the feed hopper, the supply hopper including a valve which when opened provides a batch of powder to the feed hopper.

24. A system as defined in claim 22, comprising in addition a voltage-to-pressure transducer associated with the pump and connected to the controller to adjust pressure to the pump and thereby to adjust the output of the pump.

25. A venturi tube flow meter assembly for monitoring flow rate of a fluid, comprising:

a housing block forming a venturi construction with a throat portion;

a plurality of pressure taps in the housing block;

a plurality of pressure sensors connected to the pressure taps;

a supply of gas for purging the pressure taps; and a valving mechanism for selectively connecting the pressure taps to the gas supply for purging the taps of accumulated matter and for selectively connecting the pressure sensors to atmosphere for calibration.

26. A venturi tube flow meter assembly as defined in claim 25, including filters located in each of the pressure taps.

27. A venturi tube flow meter assembly for monitoring flow rate of a fluid, comprising:

a housing block forming a venturi construction with a throat portion;

a plurality of pressure taps in the housing block;

a plurality of pressure sensors connected to the pressure taps;

a first supply of gas for purging the pressure taps;

a second supply of gas at a regulated pressure; and a valving mechanism for selectively connecting the pressure taps to the first gas supply for purging the taps of accumulated matter and for selectively connecting the pressure sensors to atmosphere for calibration, the valving mechanism selectively connecting the pressure sensor to the second supply for calibration of the pressure sensors.

28. A venturi tube flow meter assembly as defined in claim 25, comprising in addition an elongated, substantially straight inlet tube connected to the inlet of the housing block.

29. A venturi tube flow meter assembly for monitoring flow rate of a fluid, comprising:

a housing block having an inlet and an outlet, the block forming a venturi construction with a throat portion;

an elongated, substantially straight inlet tube connected to the inlet of the block;

a plurality of pressure taps in the housing block, two of the taps being located in the throat portion; and a plurality of pressure sensors connected to the pressure taps.

30. A venturi tube flow meter assembly as defined in claim 29, wherein the inlet tube has a length which is at least ten times its internal diameter.

31. A venturi tube flow meter assembly as defined in claim 29, comprising in addition a supply of gas for purging the pressure taps; and a valving mechanism for selectively connecting the pressure taps to the gas supply for purging the taps of accumulated matter and for selectively connecting the pressure sensors to atmosphere for calibration.

32. A venturi tube flow meter assembly as defined in claim 31, including filters located in each of the pressure taps.

33. A venturi tube flow meter assembly for monitoring flow rate of a fluid, comprising:

a housing block having an inlet and an outlet, the block forming a venturi construction with a throat portion;

an elongated, substantially straight inlet tube connected to the inlet of the block;

a plurality of pressure taps in the housing block, two of the taps being located in the throat portion; and a plurality of pressure sensors connected to the pressure taps;

a first supply of gas for purging the pressure taps;

a second supply of gas at a regulated pressure; and a valving mechanism for selectively connecting the pressure taps to the first gas supply for purging the taps of accumulated matter and for selectively connecting the pressure sensors to atmosphere for calibration, the valving mechanism selectively connecting the pressure sensor to the second supply for calibration of the pressure sensors.

34. A method of monitoring flow of particulate material flowing from a feed hopper through a hose to a dispenser, comprising the steps of:

monitoring the flow rate in the hose using an in-line flow meter to provide a first flow indication;

weighing the feed hopper at predetermined time intervals;

comparing the change in weight of the feed hopper over at least one of predetermined intervals to obtain a second flow indication;

comparing the first flow indication to the second flow indication to obtain a correction factor and applying the correction factor to the first flow indication to obtain a corrected flow rate.

35. A method as defined in claim 34, comprising the additional step of continuing to monitor the flow rate in the hose using an in-line flow meter to provide a first flow indication and applying the correction factor previously obtained to the first flow indication to obtain a corrected flow rate.

36. A method as defined in claim 34 for monitoring flow of particulate material from a feed hopper through two or more hoses to two or more dispensers, wherein the monitoring step is performed by using two or more in-line flow meters, each associated with one of the hoses, to provide a plurality of first flow indications, and wherein the plurality of first flow indications is used in association with the change of weight of the feed hopper to apportion the flow between the hoses.

37. A method as defined in claim 34, comprising the additional step of periodically supplying batches of particulate material to the feed hopper from a supply hopper connected to the feed hopper.

38. A method as defined in claim 37, wherein the second flow indication is obtained from previous second flow indications when a batch of particulate material is supplied from the supply hopper to the feed hopper.

39. A method as defined in claim 34, including using a display to present a corrected flow indication.

40. A method as defined in claim 34, wherein the correction factor is applied to the first flow indication to provide a linear adjustment to the first flow indication.

41. A method of monitoring flow of particulate material flowing from a feed hopper through a hose to a dispenser, comprising the steps of:

monitoring the flow rate in the hose using an in-line flow meter to provide a first flow indication;

weighing the feed hopper at predetermined time intervals;

comparing the change in weight of the feed hopper over at least one of predetermined intervals to obtain a second flow indication;

comparing the first flow indication to the second flow indication to obtain a correction factor and applying the correction factor to the first flow indication to obtain a corrected flow rate; and correcting subsequent first flow indications from the flow monitor according to a correction factor obtained from comparing a past second flow indication with a comparable first flow indication.

42. A method as defined in claim 34, wherein the first flow indication is provided using a venturi tube flow meter.

43. A method as defined in claim 42, wherein the first flow indication is provided using a venturi tube flow meter with an elongated, substantially straight inlet tube.

44. A method as defined in claim 43, wherein the first flow indication is provided using a venturi tube flow meter with an inlet tube which has a length which is at least ten times its internal diameter.

45. A method as defined in claim 34, wherein the first flow indication is provided using a venturi tube flow meter having an elongated throat with pressure taps at at least two locations in the throat.

46. A method as defined in claim 34, wherein first flow indication is provided using a venturi tube flow meter which includes pressure taps, and wherein the flow meter is connected to a supply of purge air, and comprising the additional step of forcing the gas through the pressure taps to purge the pressure taps of accumulations of particulate material.

47. A method as defined in claim 34, wherein the first flow indication is provided using a venturi tube flow meter which includes pressure taps and filters located in each of the pressure taps.

48. A method as defined in claim 2, wherein the first flow indication is provided using a venturi tube flow meter which includes a supply of gas at a regulated pressure, and comprising the additional step of calibrating the pressure sensors by using the valving mechanism to selectively connect the pressure sensors to the gas supply.

49. A method as defined in claim 34, comprising the additional steps of using a pump to transport the particulate material with the air stream through the hose and using the corrected flow rate to adjust the pump according to a set point.

50. A method as defined in claim 49, comprising the additional step of using a voltage-to-pressure transducer associated with the pump to adjust pressure to the pump and thereby to adjust the output of the pump.

* * * * *

UNITED STATES PATENT AND TRADEMARK OFFICE
CERTIFICATE OF CORRECTION

PATENT NO : 5,739,429

DATED : April 14, 1998

INVENTOR(S) : Schmitkons et al.

It is certified that error appears in the above-identified patent and that said Letters Patent is hereby corrected as shown below:

Column 8, line 8, "load is cell" should be --load cell--.
Column 8, line 52, "41)" should be --40--.
Column 12, line 66, "representative is of" should be --representative of--.

Signed and Sealed this

Sixteenth Day of June, 1998

Attest:

BRUCE LEHMAN

*Attesting Officer*

*Commissioner of Patents and Trademarks*